United States Patent
Annapureddy et al.

(10) Patent No.: US 10,223,635 B2
(45) Date of Patent: Mar. 5, 2019

(54) MODEL COMPRESSION AND FINE-TUNING

(71) Applicant: QUALCOMM Incorporated, San Diego, CA (US)

(72) Inventors: Venkata Sreekanta Reddy Annapureddy, San Diego, CA (US); Daniel Hendricus Franciscus Dijkman, Haarlem (NL); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 14/846,579

(22) Filed: Sep. 4, 2015

(65) Prior Publication Data

US 2016/0217369 A1 Jul. 28, 2016

Related U.S. Application Data

(60) Provisional application No. 62/106,608, filed on Jan. 22, 2015.

(51) Int. Cl.
*G06N 3/08* (2006.01)
*G06N 3/04* (2006.01)

(52) U.S. Cl.
CPC ............... *G06N 3/082* (2013.01); *G06N 3/04* (2013.01); *G06N 3/08* (2013.01)

(58) Field of Classification Search
CPC ............ G06N 3/08; G06N 3/082; G06N 3/04; G06N 3/0454

USPC .......................................................... 706/25
See application file for complete search history.

(56) References Cited

U.S. PATENT DOCUMENTS

| | | | |
|---|---|---|---|
| 5,058,179 A | 10/1991 | Denker et al. | |
| 5,376,962 A | 12/1994 | Zortea | |
| 6,269,351 B1* | 7/2001 | Black | G06F 17/3061 706/15 |
| 2003/0033265 A1 | 2/2003 | Cabana et al. | |
| 2011/0090950 A1 | 4/2011 | Bush et al. | |
| 2015/0088795 A1* | 3/2015 | Golovashkin | G06N 3/08 706/21 |
| 2015/0170020 A1* | 6/2015 | Garimella | G06N 3/082 706/14 |

FOREIGN PATENT DOCUMENTS

KR    20120040015 A    4/2012

OTHER PUBLICATIONS

Kang et al., "Fully Convolutional Neural Networks for Crowd Segmentation", Nov. 17, 2014.*
Jaderberg et al., "Speeding up Convolutional Neural Networks with Low Rank Expansions", 2014.*
Jiang J., "Image Compression with Neural Networks: A Survey", Signal Processing: Image Communication 14, 1999, pp. 737-760.
(Continued)

*Primary Examiner* — Dave Misir
(74) *Attorney, Agent, or Firm* — Seyfarth Shaw LLP

(57) ABSTRACT

Compressing a machine learning network, such as a neural network, includes replacing one layer in the neural network with compressed layers to produce the compressed network. The compressed network may be fine-tuned by updating weight values in the compressed layer(s).

34 Claims, 15 Drawing Sheets

(56) References Cited

OTHER PUBLICATIONS

Mohan M. S. et al., "Modified Distributive Arithmetic based 2d-Dwt for Hybrid (Neural Network—Dwt) Image Compression", Global Journal of Computer Science and Technology (F) vol. XIV Issue II Version I, 2014, Global Journals Inc., pp. 37-48.
Denton E., et al., "Exploiting Linear Structure Within Convolutional Networks for Efficient Evaluation", Apr. 2, 2014 (Apr. 2, 2014), pp. 1-16, XP055229687, Retrieved from the Internet: URL: http://www.researchgate.net/profile/Joan_Bruna.publication/261368736_Exploiting_Linear_Structure_Within_Convolutional_Networks_for_Efficient_Evaluation/links/0c960535ec07f32e3a000000pdfinViewer=true&pdfJsDownload=true&disableCoverPage=true&origin=publication_detail [retrieved on Nov. 19, 2015] p. 1-p. 15.
Gong Y., et al., "Compressing Deep Convolutional Networks Using Vector Quantization," Dec. 18, 2014 (Dec. 18, 2014), pp. 1-10, XP055262159, Retrieved from the Internet: URL:http://arxiv.org/pdf/1412.6115v1.pdf [retrieved on Apr. 1, 2016], p. 1-p. 9, paragraph 3.
International Search Report and Written Opinion—PCT/US2015/065783—ISA/EPO—dated Apr. 18, 2016.
Zhicheng Y., et al., "HD-CNN: Hierarchical Deep Convolutional Neural Networks for Large Scale Visual Recognition," 2015 IEEE International Conference on Computer Vision (ICCV), IEEE, Dec. 7, 2015 (Dec. 7, 2015), pp. 2740-2748, XP032866619, DOI: 10.1109/ICCV.2015.314 [retrieved on Feb. 17, 2016].

\* cited by examiner

Uncompressed Model

Compressed Model

Uncompressed Model

Compressed Model

MODEL COMPRESSION AND FINE-TUNING

CROSS-REFERENCE TO RELATED APPLICATION

The present application claims the benefit of U.S. Provisional Patent Application No. 62/106,608, filed on Jan. 22, 2015, entitled "MODEL COMPRESSION AND FINE-TUNING," the disclosure of which is expressly incorporated by reference herein in its entirety.

BACKGROUND

Field

Certain aspects of the present disclosure generally relate to neural system engineering and, more particularly, to systems and methods for compressing a neural network.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In one aspect, a method of compressing a machine learning network, such as a neural network, is disclosed. The method includes replacing at least one layer in the neural network with multiple compressed layers to produce a compressed neural network. The method also includes inserting nonlinearity between the compressed layers of the compressed network. Further, the method includes fine-tuning the compressed network by updating weight values in at least one of the compressed layers.

Another aspect discloses an apparatus for compressing a machine learning network, such as a neural network. The apparatus includes means for replacing at least one layer in the neural network with multiple compressed layers to produce a compressed neural network. The apparatus also includes means for inserting nonlinearity between the compressed layers of the compressed network. Further, the apparatus includes means for fine-tuning the compressed network by updating weight values in at least one of the compressed layers.

Another aspect discloses an apparatus for compressing a machine learning network, such as a neural network. The apparatus includes a memory and at least one processor coupled to the memory. The processor(s) is configured to replace at least one layer in the neural network with multiple compressed layers to produce a compressed neural network. The processor(s) is also configured to insert nonlinearity between the compressed layers of the compressed network. Further, the processor(s) is also configured to fine-tune the compressed network by updating weight values in at least one of the compressed layers.

Another aspect discloses a non-transitory computer-readable medium. The computer readable medium has non-transitory program code recorded thereon for compressing a machine learning network, such as a neural network. The program code, when executed by the processor(s), causes the processor(s) to replace at least one layer in the neural network with multiple compressed layers to produce a compressed neural network. The program code also causes the processor(s) to insert nonlinearity between the compressed layers of the compressed network. Further, the program code also causes the processor(s) to fine-tune the compressed network by updating weight values in at least one of the compressed layers.

In another aspect, a method for compressing a machine learning network, such as a neural network, is disclosed. The method includes replacing at least one layer in the neural network with multiple compressed layers to produce a compressed neural network such that a receptive field size of the compressed layers combined match a receptive field of uncompressed layers. The method also includes fine-tuning the compressed network by updating weight values in at least one of the compressed layers.

Another aspect discloses an apparatus for compressing a machine learning network, such as a neural network. The apparatus includes means for replacing at least one layer in the neural network with multiple compressed layers to produce a compressed neural network such that a receptive field size of the compressed layers combined match a receptive field of uncompressed layers. The apparatus also includes means for fine-tuning the compressed network by updating weight values in at least one of the compressed layers.

Another aspect discloses an apparatus for compressing a machine learning network, such as a neural network. The apparatus includes a memory and at least one processor coupled to the memory. The processor(s) is configured to replace at least one layer in the neural network with multiple compressed layers to produce a compressed neural network such that a receptive field size of the compressed layers combined match a receptive field of uncompressed layers. The processor(s) is also configured to fine-tune the compressed network by updating weight values in at least one of the compressed layers.

Another aspect discloses a non-transitory computer-readable medium. The computer readable medium has non-transitory program code recorded thereon for compressing a machine learning network, such as a neural network. The program code, when executed by the processor(s), causes the processor(s) to replace at least one layer in the neural network with multiple compressed layers to produce a compressed neural network such that a receptive field size of the compressed layers combined match a receptive field of uncompressed layers. The program code also causes the processor(s) to fine-tune the compressed network by updating weight values in at least one of the compressed layers.

In another aspect, a method of compressing a machine learning network, such as a neural network, is disclosed. The method includes replacing at least one layer in the neural network with multiple compressed layers to produce a compressed neural network. The method also includes determining weight matrices of the compressed layers by applying an alternating minimization process.

Another aspect discloses an apparatus for compressing a machine learning network, such as a neural network. The apparatus includes means for replacing at least one layer in the neural network with multiple compressed layers to produce a compressed neural network. The apparatus also includes means for determining weight matrices of the compressed layers by applying an alternating minimization process.

Another aspect discloses an apparatus for compressing a machine learning network, such as a neural network. The apparatus includes a memory and at least one processor coupled to the memory. The processor(s) is configured to replace at least one layer in the neural network with multiple compressed layers to produce a compressed neural network. The processor(s) is also configured to determine weight matrices of the compressed layers by applying an alternating minimization process.

Another aspect discloses a non-transitory computer-readable medium. The computer readable medium has program code recorded thereon for compressing a machine learning network, such as a neural network. The program code, when executed by the processor(s), causes the processor(s) to replace at least one layer in the neural network with multiple compressed layers to produce a compressed neural network. The program code also causes the processor(s) to determine weight matrices of the compressed layers by applying an alternating minimization process.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
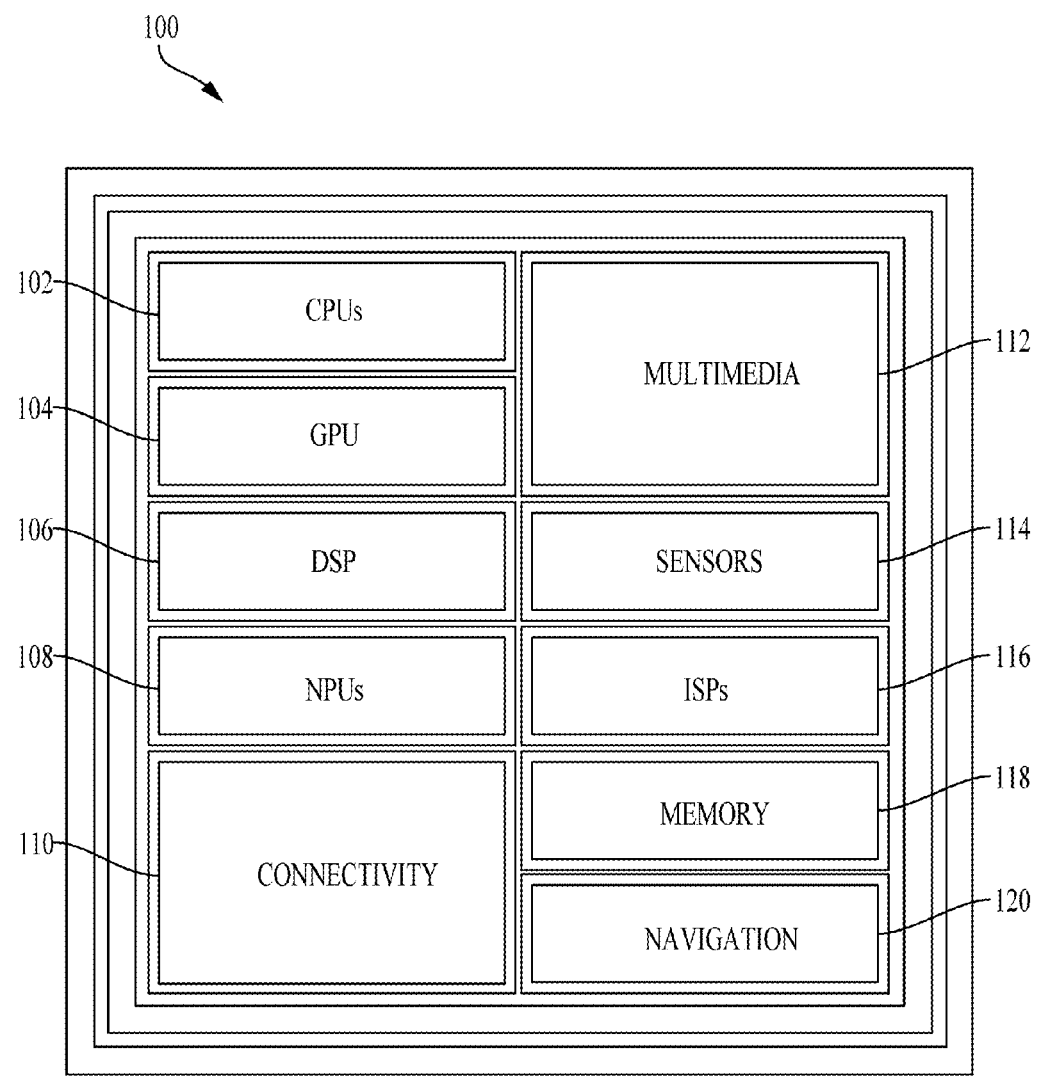
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Model Compression and Fine-Tuning

Deep neural networks perform the state of the art in several artificial intelligence tasks such as image/video classification, speech recognition, face recognition etc. Neural network models are trained from a large database of training examples, and typically, larger models tend to achieve better performance. For the purpose of deploying these neural network models on mobile devices such as smartphones, robots, and cars, it is desirable to reduce or minimize the computational complexity, memory footprint and power consumption as much as possible. These are also desired properties for cloud applications such as the data centers processing millions of images/videos per day.

Aspects of the present disclosure are directed to a method of compressing the neural network models. The compressed model has a significantly fewer number of parameters, and hence has smaller memory footprint. In addition, the compressed model has significantly fewer operations, and hence results in faster inference run-time.

Convolutional neural network models may be divided into a sequence of layers. Each layer may transform an input received from one or more preceding layers in the network and may produce an output which may be supplied to subsequent layers of the network. For example, a convolutional neural network may include fully-connected layers, convolutional layers, locally-connected layers and other layers. Each of the different layers may perform a different type of transformation.

In accordance with aspects of the present disclosure, fully-connected layers, convolutional layers and locally-connected layers may be compressed. All of these layers may apply linear transformation on input values, where the linear transformations are parameterized by weight values. The weight values may be represented as two dimensional matrices or higher dimensional tensors. The linear transformation structure may be different for different layer types.

In some aspects, a layer may be compressed by replacing it with multiple layers of the same type. For example, a convolutional layer may be compressed by replacing it with multiple convolutional layers, and a fully-connected layer may be compressed by replacing it with multiple fully-connected layers. The neurons in the compressed layer may be configured with an identity activation function. Although one layer may be replaced with multiple compressed layers, the sum complexity (and memory footprint) of all the compressed layers together may be smaller than that of the single uncompressed layer.

Model compression may, however, come at the expense of a drop in the performance of the neural network. For example, if the neural network is used for a classification problem, the classification accuracy may drop due to compression. This drop in accuracy limits the extent of compression, because higher compression results in a higher drop in accuracy. To combat the drop in accuracy, in some aspects, the compressed model may be fine-tuned using training examples. Fine-tuning of the compressed models may recapture the drop in accuracy and thus may result in improved compression without too much of a drop in the classification accuracy. The fine-tuning of the compressed model may be conducted on a layer-by-layer basis.

Thus, aspects of the present disclosure provide compression techniques in which a layer of the neural network is replaced with more such layers. Hence, the resulting compressed model is another convolutional neural network model. This is a significant advantage because development of new and explicit techniques for implementing the compressed model may be avoided. That is, if any neural network library is compatible with the original uncompressed model, it would also be compatible with the compressed model. Furthermore, because the resulting compressed model is a convolutional neural network, full stack fine-tuning (e.g., back propagation) may be performed, rather than limiting fine-tuning to a particular layer.

A neural network is made of several layers. Each layer takes as an input, activation vectors from one or more previous layers, applies a linear/nonlinear transformation on the combined input vector, and outputs an activation vector to be used by subsequent layers. Some layers are parameterized with weights, whereas some layers are not. Aspects of the present disclosure are concerned with the weight layers: 1) Fully-connected layers, 2) Convolutional layers, and 3) Locally-connected layers. All three layers carry out a linear transformation, but differ in how the output neurons are connected to input neurons.

FIG. 1 illustrates an example implementation of the aforementioned compressing a neural network using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC may be based on an ARM instruction set. In an aspect of the present disclosure, the instructions loaded into the general-purpose processor 102 may comprise code for replacing at least one layer in a machine learning network, such as a neural network, with multiple compressed layers to produce a compressed network, inserting nonlinearity between the compressed layers of the compressed network and/or fine-tuning the compressed network by updating the weight values in at least one of the compressed layers.

In another aspect of the present disclosure, the instructions loaded into the general-purpose processor 102 may comprise code for replacing at least one layer in a machine learning network, such as a neural network, with multiple compressed layers to produce a compressed network such that a receptive field size of the compressed layers combined match a receptive field of uncompressed layers. There may also be code for fine-tuning the compressed network by updating weight values in at least one of the compressed layers.

In yet another aspect of the present disclosure, the instructions loaded into the general-purpose processor 102 may comprise code for replacing at least one layer in a machine learning network, such as a neural network, with multiple compressed layers to produce a compressed network. There may also be code for determining weight matrices of the compressed layers by applying an alternating minimization process.

Figure 2:
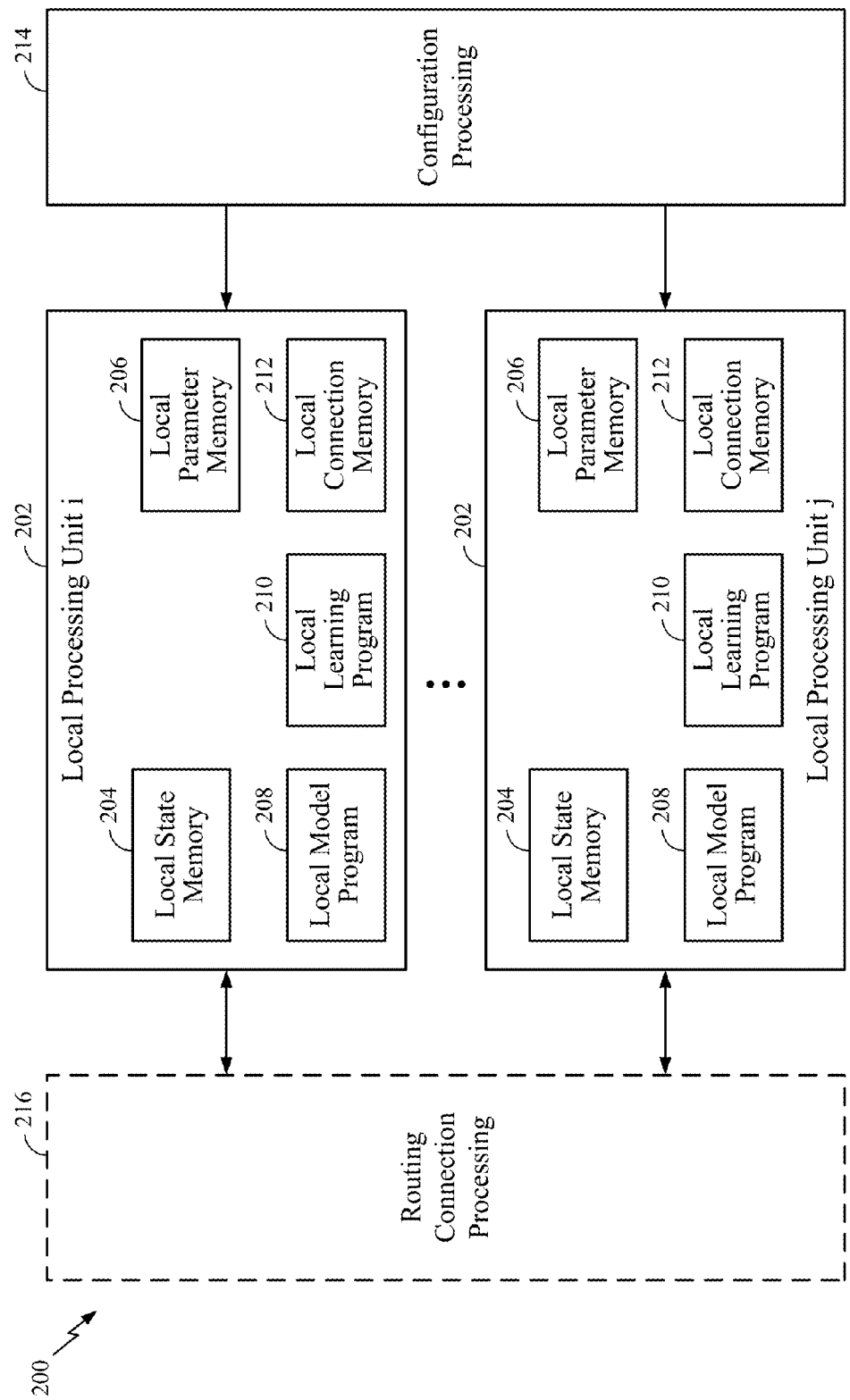
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize simple features, such as edges, in the input stream. If presented with auditory data, the first layer may learn to recognize spectral power in specific frequencies. The second layer, taking the output of the first layer as input, may learn to recognize combinations of features, such as simple shapes for visual data or combinations of sounds for auditory data. Higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer is communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
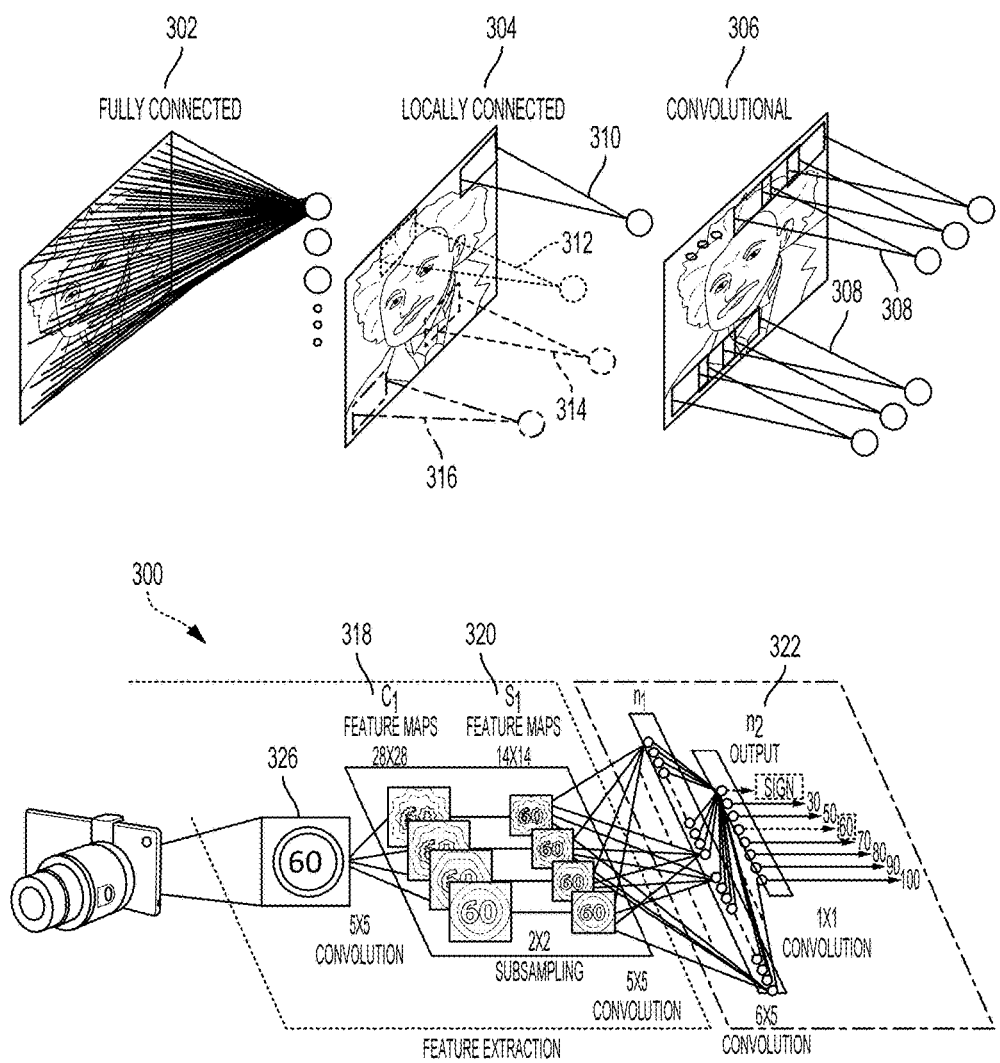
FIG. 3A is a diagram illustrating a neural network in accordance with aspects of the present disclosure.

Referring to FIG. 3A, the connections between layers of a neural network may be fully-connected 302 or locally connected 304. In a fully-connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image 326, such as a cropped image of a speed limit sign, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
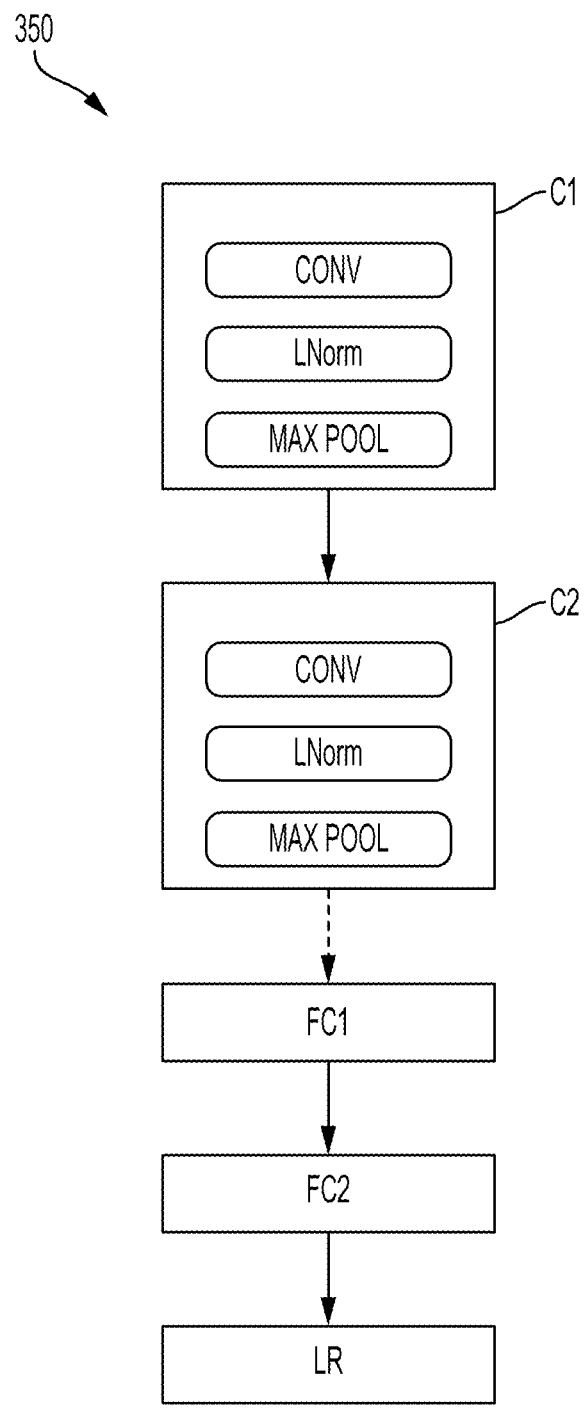
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully-connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4A:
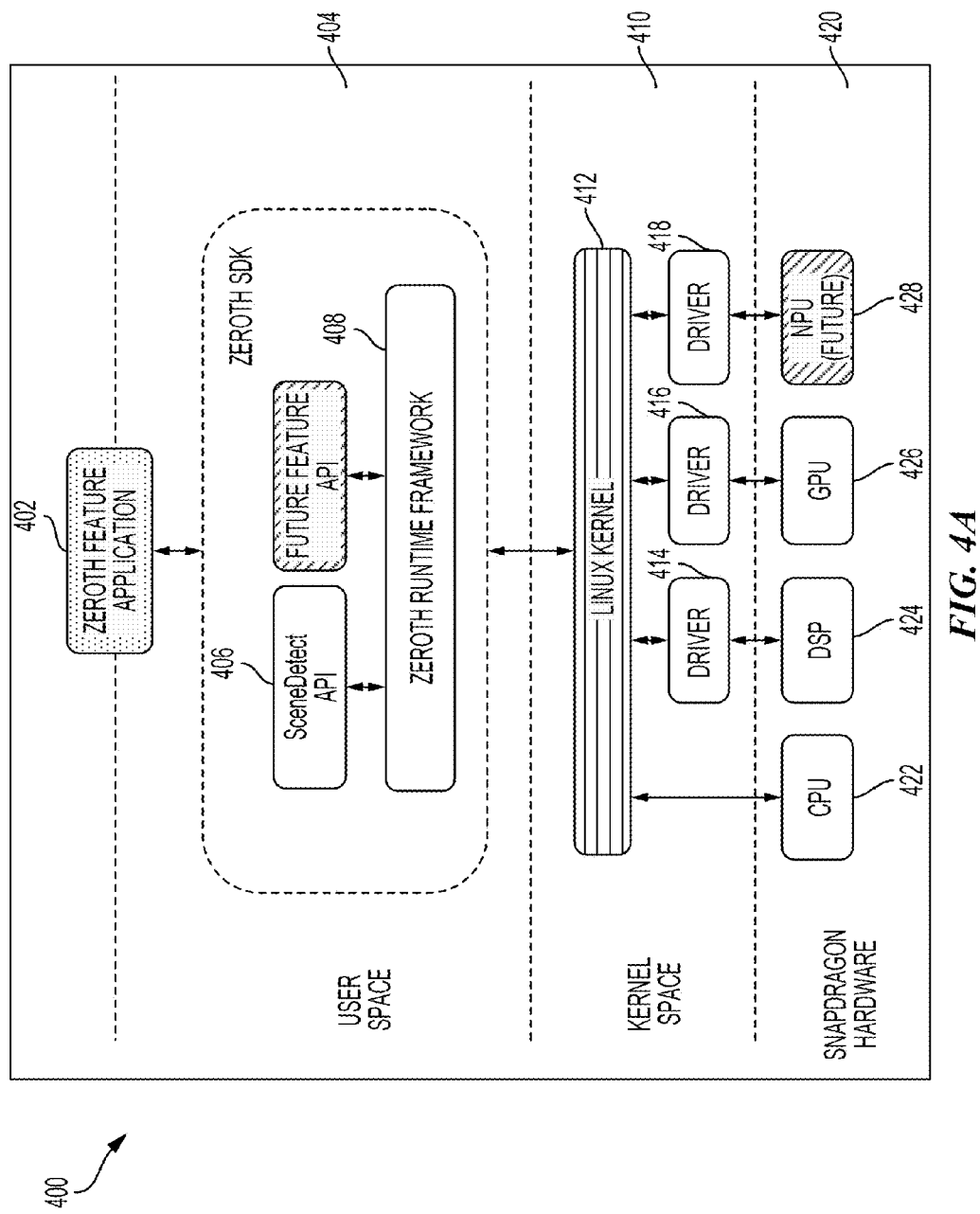
FIG. 4A is a block diagram illustrating an exemplary software architecture that may modularize artificial intelligence (AI) functions in accordance with aspects of the present disclosure.

FIG. 4A is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 4B:
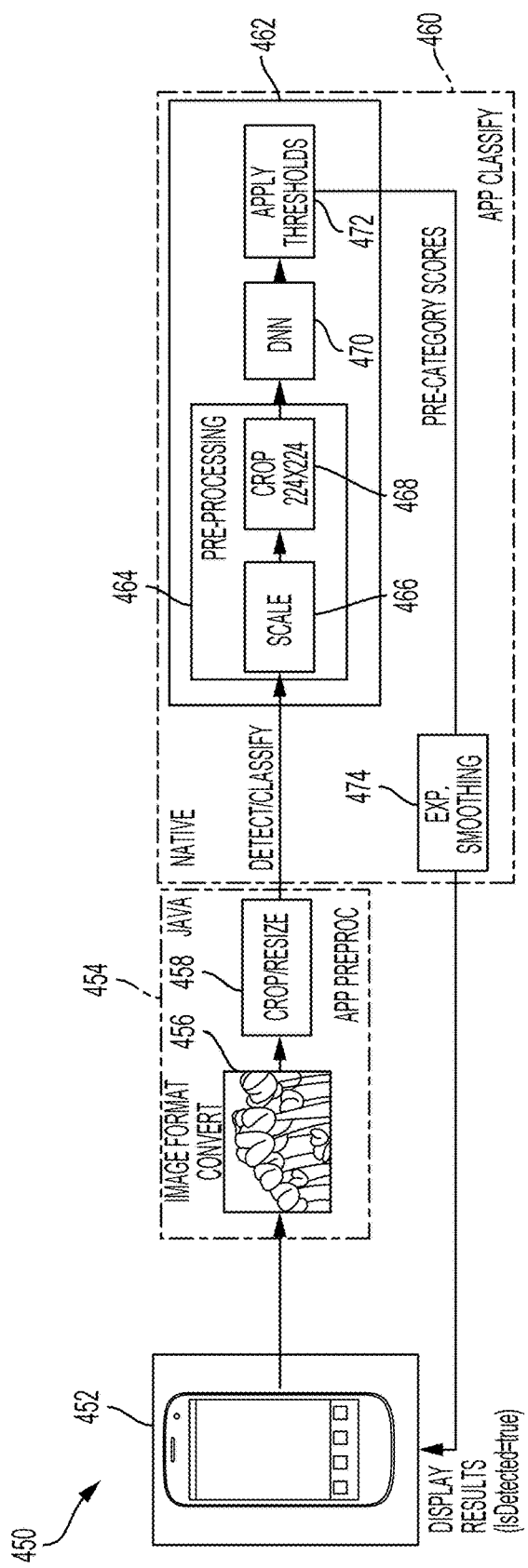
FIG. 4B is a block diagram illustrating the run-time operation of an AI application on a smartphone in accordance with aspects of the present disclosure.

FIG. 4B is a block diagram illustrating the run-time operation 450 of an AI application on a smartphone 452. The AI application may include a pre-process module 454 that may be configured (using for example, the JAVA programming language) to convert the format of an image 456 and then crop and/or resize the image 458. The pre-processed image may then be communicated to a classify application 460 that contains a SceneDetect Backend Engine 462 that may be configured (using for example, the C programming language) to detect and classify scenes based on visual input. The SceneDetect Backend Engine 462 may be configured to further preprocess 464 the image by scaling 466 and cropping 468. For example, the image may be scaled and cropped so that the resulting image is 224 pixels by 224 pixels. These dimensions may map to the input dimensions of a neural network. The neural network may be configured by a deep neural network block 470 to cause various processing blocks of the SOC 100 to further process the image pixels with a deep neural network. The results of the deep neural network may then be thresholded 472 and passed through an exponential smoothing block 474 in the classify application 460. The smoothed results may then cause a change of the settings and/or the display of the smartphone 452.

In one configuration, a machine learning model, such as a neural network, is configured for replacing one or more layers in the network, inserting nonlinearity between the compressed layers of the compressed network and/or fine-tuning the compressed network. The model includes replacing means, inserting means and tuning means. In one aspect, the replacing means, inserting means, and/or tuning means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

In another configuration, a machine learning model, such as a neural network, is configured for replacing one or more layer in the network with multiple compressed layers to produce a compressed network such that a receptive field size of the compressed layers combined match a receptive field of uncompressed layers. The model is also configured for fine-tuning the compressed network by updating weight values in one or more of the compressed layers. The model includes replacing means and tuning means. In one aspect, the replacing means, and/or tuning means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

In yet another configuration, a machine learning model, such as a neural network, is configured for replacing one or more layers in the network and/or for determining weight matrices of the compressed layers by applying an alternating minimization process. The model includes replacing means and determining means. In one aspect, the replacing means, and/or determining means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the network based upon desired one or more functional features of the network, and to develop the one or more functional features towards the desired functional features as the determined parameters are further adapted, tuned and updated.

Compression of Fully-Connected Layers

Figure 5A:
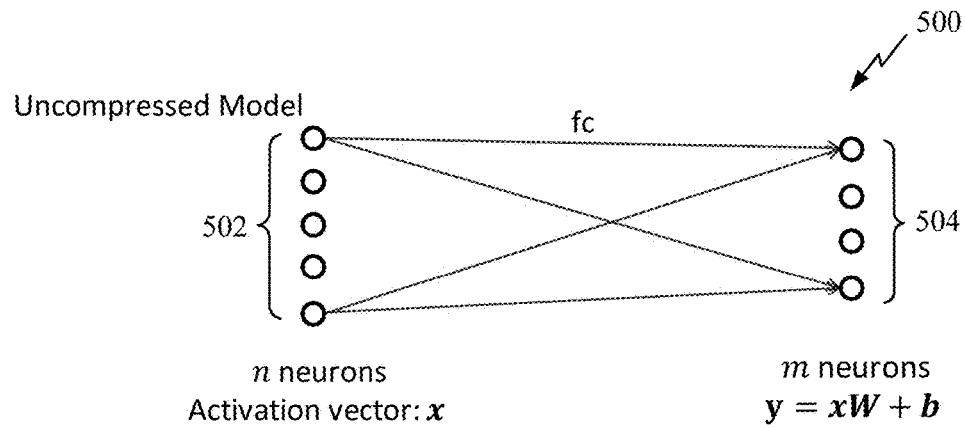
FIGS. 5A-B and 6A-B are block diagrams illustrating a fully-connected layer and a compressed fully-connected layer in accordance with aspects of the present disclosure.
Figure 5B:
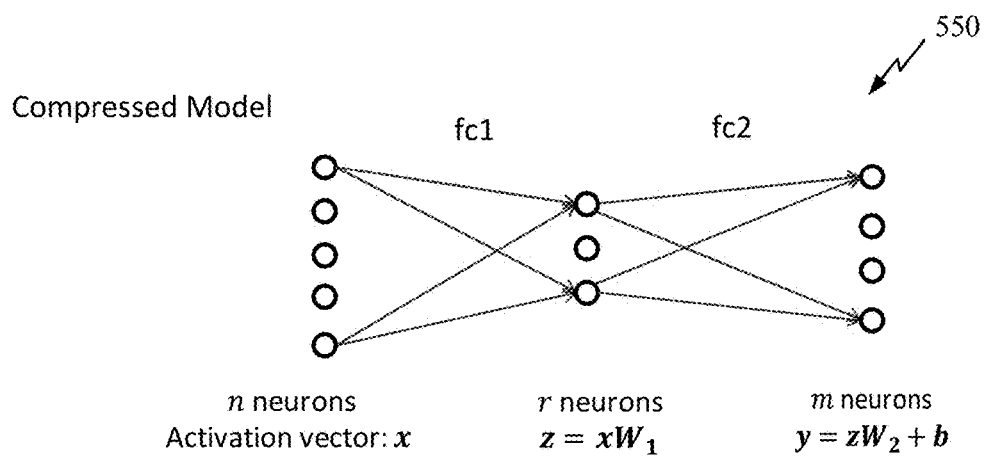

FIGS. 5A-B are block diagrams illustrating a fully-connected layer and a compressed fully-connected layer in accordance with aspects of the present disclosure. As shown in FIG. 5A, each of the output neurons 504 of the fully-connected layer (fc) 500 is connected to each of the input neurons 502 via a synapse in an all-to-all fashion (a subset of the all-to-all connections are shown for ease of illustration). The fc layer has n input neurons and m output neurons. The weight of the synapse connecting ith input neuron to jth output neuron is denoted by $w_{ij}$. All of the weights of the synapses connecting the n input neurons and m output neurons may be collectively represented using the matrix W. The output activation vector y may be obtained by multiplying the input activation vector x by the weight matrix W, and adding a bias vector b.

Figure 6A:
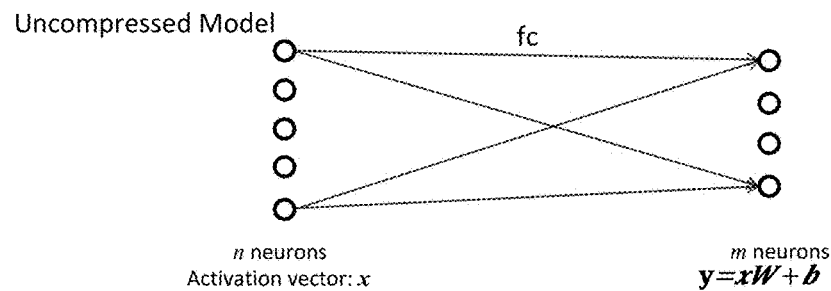
Figure 6B:
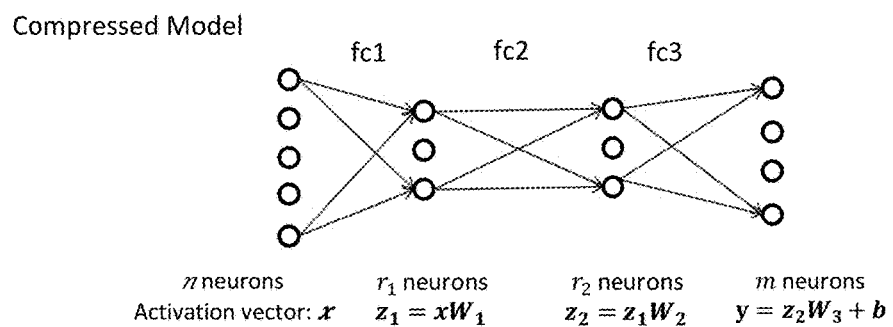

FIG. 5B illustrates an exemplary compressed fully-connected layer 550. As shown in FIG. 5B, a single fully-connected layer is replaced with two fully-connected layers. That is, the fully-connected layer named 'fc' of FIG. 5A is replaced with two fully-connected layers 'fc1' and 'fc2' shown in FIG. 5B. Although, only one additional fully-connected layer is shown, the present disclosure is not so limited, and additional fully-connected layers may be used to compress the fully-connected layer fc. For example, FIGS. 6A-B illustrate a fully-connected layer and a compressed fully-connected layer with three fully-connected layers. As shown in FIGS. 6A-B, an uncompressed fully-connected layer 'fc' is replaced with three fully-connected layers 'fc1', 'fc2' and 'fc3'. The number of neurons $r_1$ and $r_2$ in the intermediate layers may be determined based on the compression they achieve, and the performance of the resulting compressed network.

The advantage with compression can be understood by comparing the total number of parameters before and after compression. The number of parameters before compression may be equal to the number of elements in the weight matrix W=nm, plus the bias vector, which is equal to m. Thus, the total number of parameters before compression is equal to nm+m. However, the number of parameters after compression in FIG. 5B is equal to the sum of number of parameters in the layers 'fc1' and 'fc2', which is equal to nr+rm. Depending on the value of r, a significant reduction in the number of parameters could be achieved.

The effective transformation achieved by the compressed network is given by:

$$y=W_2W_1x+b, \quad (1)$$

where $W_1$ and $W_2$ are weight matrices, respectively, for the compressed fully-connected layers fc1 and fc2.

The weight matrices of the compressed layers may be determined such that the effective transformation is a close approximation of the transformation achieved by the original fully-connected layer fc:

$$y=Wx+b. \quad (2)$$

The weight matrices $W_1$ and $W_2$ may be chosen to reduce the approximation error, which is given by:

$$|W-W_2W_1|^2 \quad (3)$$

so that the effective transformation of Equation 1 achieved by the compressed layers fc1 and fc2 closely approximates the transformation of the original fully-connected layer specified in Equation 2.

Similarly, the number of parameters after compression in FIG. 6B is equal to $nr_1+r_1r_2+r_2m+m$. Again, depending on the values of $r_1$ and $r_2$, significant reduction in the number of parameters could be achieved.

The effective transformation achieved by the compressed layers 'fc1', 'fc2', and 'fc3' together in the compressed network shown in FIG. 6B is $y=W_3W_2W_1x+b$. The weight matrices $W_2$, $W_2$ and $W_3$ may be determined so that the effective transformation is an approximation of the transformation achieved by the original 'fc' layer (shown in FIG. 6A) y=Wx+b.

One method for determining the weight matrices of compressed layers is by repeatedly applying the singular value decomposition (SVD). The SVD may be used to compute a rank approximation of W, from which the weight matrices $W_1$ and $W_2$ may be determined.

Another method for determining the weight matrices $W_1$ and $W_2$ of the compressed layers is by applying the alternating minimization process. According to the alternating minimization process, matrices are initialized with random values and the compressed matrices are updated alternatively, one at a time, using least squares to reduce or minimize the objective function of Equation 3 and thereby improve the approximation.

In some aspects, the weight matrices may be determined by training the compressed network. For example, the inputs and outputs for the uncompressed layer may be recorded for a set of training examples. Then gradient descent, for example, may be used to initialize the compressed layers to produce the outputs corresponding to the uncompressed layer.

Because the compressed network is an approximation of the original network, the end-to-end behavior of the compressed network may be slightly or significantly different compared to the original network. As a result, the new compressed network may not perform as well as the original network for the task the network is designed to accomplish. To combat the drop in performance, fine-tuning and modifying the weights of the compressed network may be performed. For example, back propagation through all of the compressed layers may be applied to modify the weights. Alternatively, back propagation through a subset of the layers may be performed or through both the compressed and uncompressed layers throughout the entire model from the output back to the input may be performed. Fine-tuning can be achieved by teaching the neural network with some training examples. Depending on the availability, either the same training examples for training the original network, or a different set of training examples, or a subset of old and new training examples may be employed.

During fine-tuning, we may choose to fine-tune only the new compressed layers or all the layers together (which may be referred to as full stack fine-tuning) or a subset of the compressed and uncompressed layers. The compressed layers as shown for example in FIGS. 5B and 6B are another instance of the fully-connected layer type as shown, respectively, in FIGS. 5A and 6A. Thus, the design or implementation of new techniques either for training the compressed layers or for performing inference using the compressed network may be circumvented. Instead, any training and inference platform available for the original network may be reused.

Compression of Convolutional Layers

Convolutional layers of a neural network may also be compressed. The approach for compressing convolutional layers is in some ways similar to that described above for fully-connected layers. For example, as in the case of fully-connected layers, the weight matrices of compressed convolution layers may be selected such that the effective transformation achieved by the compressed layers is a good approximation to the transformation achieved by the original uncompressed convolution layer. However, there are some differences due to architectural differences between the fully-connected layers and convolutional layers.

Figure 7:
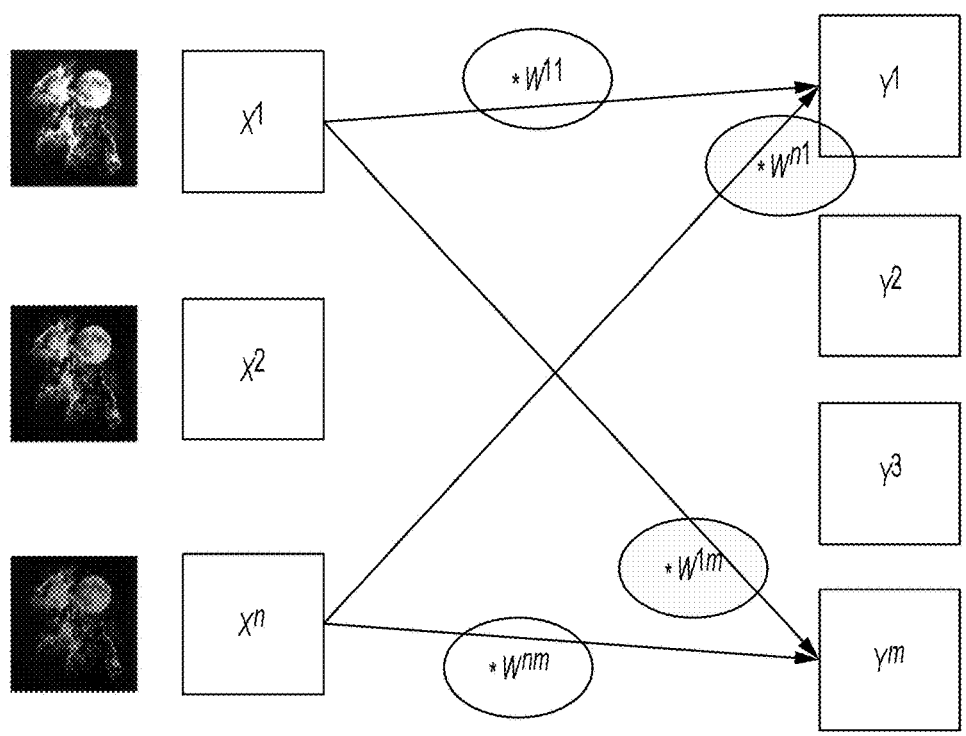
FIG. 7 is a block diagram illustrating an exemplary convolutional layer in accordance with aspects of the present disclosure.

FIG. 7 is a block diagram illustrating an exemplary convolutional layer in accordance with aspects of the present disclosure. A convolutional layer connects n input maps to m output maps. Each map may comprise a set of neurons (e.g., a 2-dimensional (2-D) grid or 3-D map) corresponding to either spatial dimensions of an image, or time-frequency dimensions in an audio signal, etc. For example, in some aspects, the set of neurons may correspond to video data or voxel data (e.g., a magnetic resonance imaging (MRI) scan). The convolution layer applies a convolutional kernel $W^{ij}$ to the ith input map $X^i$, and adds the result to the jth output map $Y^j$, where the index i runs from 1 to n, and the index j runs from 1 to m. In other words, the jth output map $Y^j$ can be expressed as:

$$Y^j = \sum_{i=1}^{n} X^i * W^{ij} + B^j. \quad (4)$$

Figure 8A:
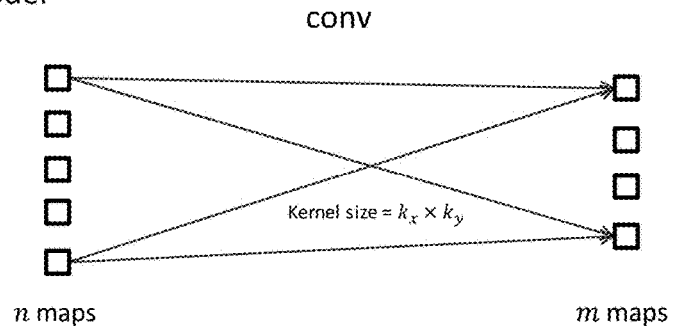
FIGS. 8A-B and 9A-B illustrate an example compression of a convolutional layer in accordance with aspects of the present disclosure.
Figure 8B:
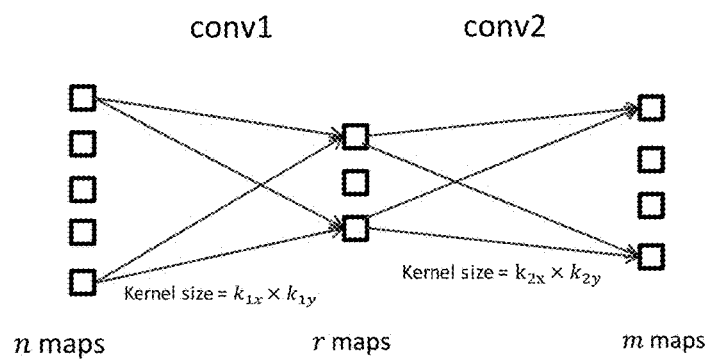

FIGS. 8A-B illustrate an example compression of a convolutional layer in accordance with aspects of the present disclosure. Referring to FIGS. 8A-B, the convolution layer named 'conv' is replaced with two convolution layers 'conv1' and 'conv2'.

Figure 9A:
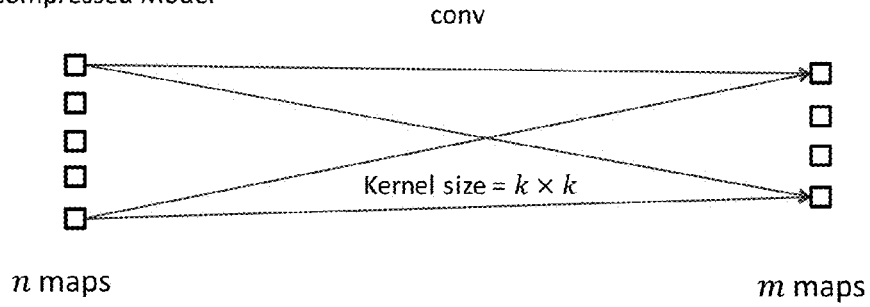
Figure 9B:
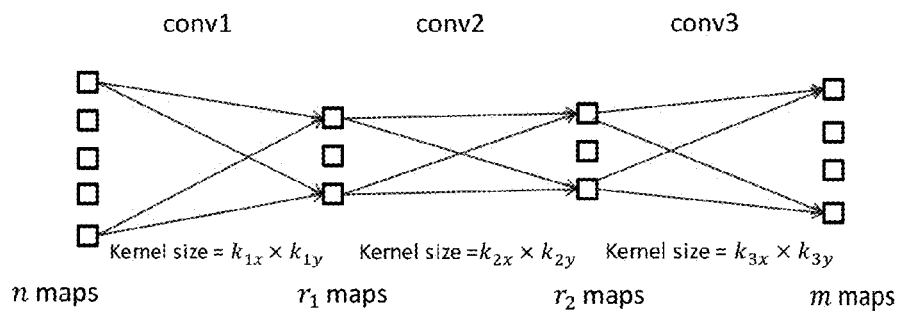

As indicated above with respect to fully-connected layers, the number of compressed layers (replacement layers) is not limited to the two shown in FIG. 8B, and any number of compressed layers may instead be used according to design preference. For example, FIGS. 9A-B illustrate an example compression in which the 'conv' layer is replaced with three convolution layers 'conv1', 'conv2' and 'conv3'. In that case (FIG. 9B), the number of maps $r_1$ and $r_2$ in the intermediate layers may be determined based on the compression achieved, and the performance of the resulting compressed network.

Replacing with Two Convolution Layers

The effective transformation achieved by the compressed layers 'conv1' and 'conv2' together in the compressed network described in FIG. 8B can be expressed as:

$$Y^j = \sum_{k=1}^{r_1} Z^k * W_2^{kj} + B^j = \sum_{i=1}^{n} X^i * (\sum_{k=1}^{r_1} W_1^{ik} * W_2^{kj}) + B^j, \quad (5)$$

where Bj is a bias term, and $Z^k$ is an activation vector of the added layer of neurons and $r_1 = r$ in this example. Essentially, the weight matrices $W^{ij}$ of the 'conv' layer in the original network is approximated in the compressed network through the weight matrices $W_1^{ik}$ of the 'conv1' layer and $W_2^{kj}$ of the 'conv2' layer as $$W^{ij} \approx \Sigma k = 1^{r_1} W_1^{ik} * W_2^{kj}, \quad i=1,2 \ldots, n, j=1,2, \ldots, m. \quad (6)$$

To make sure that the effective transformation of compressed convolution layers (Equation 5) is a close approximation to the transformation of the original convolution layer, the weight matrices of the compressed layers may be chosen so as to reduce or minimize the approximation error which is specified as:

$$\sum_{i,j=1,1}^{n,m} \left( W^{ij} - \sum_{k=1}^{r_1} W_1^{ik} * W_2^{kj} \right)^2. \quad (7)$$

Again, the SVD method, the alternating minimization process or the like may be used to determine the weight matrices of the compressed layer that reduces or minimizes the objective function of Equation 7.

Kernel Sizes of the Compressed Convolutional Layers

For the approximation error mentioned in Equation 7 to make sense, the matrix $W^{ij}$ should have the same dimensions as the matrix $W_1^{ik} * W_2^{kj}$. For this purpose, the kernel sizes of the compressed convolutional layers 'conv1' and 'conv2' may be chosen appropriately. For example, if $k_x \times k_y$ denote a kernel size of the uncompressed 'conv' layer, the kernel size of the compressed convolutional layers ''conv1' and 'conv2' may be chosen such that they satisfy:

$$(k_{1x}-1)+(k_{2x}-1)=(k_x-1)$$

and $$(k_{1y}-1)+(k_{2y}-1)=(k_y-1), \quad (8)$$

where $k_{1x} \times k_{1y}$ represents the kernel size of the 'conv1' layer and $k_{2x} \times k_{2y}$ represents the kernel size of the 'conv2' layer.

Thus, a convolution layer with kernel size $k_x \times k_y$ may be replaced with two convolutional layers with kernel sizes $k_x \times k_y$ and 1×1 respectively, or vice versa.

Furthermore, in some aspects, a convolutional layer with kernel size $k_x \times k_y$ may be replaced with three convolutional layers with kernel sizes 1×1, $k_x \times k_y$, and 1×1 respectively.

In some aspects, the respective kernel sizes $k_1$ and $k_2$ of the compressed convolution layers, 'conv1' and 'conv2' may be chosen to satisfy:

$$k_1 + k_2 - 1 = k, \quad (9)$$

where k is the kernel size of the uncompressed convolution layer 'conv'. Table 1 below provides an example of different possible kernel sizes $k_1$ and $k_2$ where the kernel size of the uncompressed convolution layer 'conv' is k=5.

TABLE 1

| $k_1$ | $k_2$ | $k_1 + k_2 - 1$ |
|---|---|---|
| 5 | 1 | 5 |
| 4 | 2 | 5 |
| 3 | 3 | 5 |
| 2 | 4 | 5 |
| 1 | 5 | 5 |

Replacing with Multiple Convolution Layers

A convolutional layer can also be replaced with more than two convolutional layers. For ease of exposition, suppose L convolutional layers are used to replace one convolutional layer. Then, weight values $W_l$ of the lth layer are chosen in order to reduce or minimize the objective function $$\sum_{i,j=1,1}^{n,m} \left( W^{ij} - \sum_{k_1,k_2 \ldots k_L=1,1,\ldots 1}^{r_1,r_2,\ldots ,r_L} W_1^{ik_1} * W_2^{k_1 k_2} * \ldots * W_L^{k_{L-1},j} \right)^2, \quad (10)$$

where the variables $r_l$ denotes the number of output maps of the lth layer. Again, for the objective function to make sense, the kernel size $k_{lx} \times k_{ly}$ of the lth layer may be chosen such that they satisfy:

$$(k_{1x}-1)+(k_{2x}-1)+ \ldots +(k_{Lx}-1)=(k_x-1)$$

and $$(k_{1y}-1)+(k_{2y}-1)+ \ldots +(K_{Ly}-1)=(k_y-1). \quad (11)$$

Accordingly, in some aspects, a convolution layer with kernel size $k_x \times k_y$ that is replaced with multiple convolutional layers with kernel sizes $k_{1x} \times k_{1y}$, $k_{2x} \times k_{2y}$, and so on, such that the properties $(k_{1x}-1)+(k_{2x}-1)+ \ldots =(k_x-1)$ and $(k_{1y}-1)+(k_{2y}-1)+ \ldots =(k_y-1)$ are satisfied.

Alternating Minimization Process

In the special case, where one of the compressed convolution layers has a kernel size of 1×1, and the other compressed layer has the same kernel size of the uncompressed layer, the SVD method can be used to determine the compressed weight matrices optimizing the objective function stated, for example, in Equation 7 and Equation 10. In one aspect, this special case corresponds to either ($k_{1x} \times k_{1y}$=1×1 and $k_{2x} \times k_{2y} = k_x \times k_y$) or ($k_{1x} \times k_{1y} = k_x \times k_y$, and $k_{2x} \times k_{2y}$=1×1).

In the general case, where neither compressed layer has a kernel size of 1×1, the alternating minimization method can be used to determine the compressed weight matrices optimizing Equation 7 and Equation 10. The alternating minimization method includes the following steps:

(1) Initialize the weight matrices $W_1^{ik}$ of 'conv1' layer and $W_2^{kj}$ of 'conv2' layer with random values (2) Solve for the weights of each compressed layer in an alternating fashion:
  (a) Fix 'conv2' layer weights, and solve for 'conv1' layer weights minimizing Equation 7.
  (b) Fix 'conv1' layer weights, and solve for 'conv2' layer weights minimizing Equation 7.

(3) Repeat step 2 until convergence, or for a pre-determined number of iterations.

The steps 2a and 2b can be solved in closed-form using the standard least-squares process.

Note that, after the compressed weights are determined using the SVD method or the alternating minimization method, the compressed network can be fine-tuned to recapture the loss in classification performance to some extent.

Compression of Locally-Connected Layers

In a convolution layer, the same convolution kernel is applied throughout the input image map, whereas in a locally-connected layer different weight values are applied at different spatial locations. Accordingly, the compression approach explained for convolution layers can similarly be applied to locally-connected layers by applying the compression method (see equations 4-11 above) at different spatial locations.

Selection of Design Parameters

Several of the design parameters involved in compression (e.g., the number of intermediate neurons in the case of fully-connected layers; the number of output maps and the kernel sizes in the case of convolutional layers) may be chosen, for example, by empirically measuring the compression achieved and the corresponding functional performance of the compressed network.

In one example, the number of neurons in the intermediate layer r may be selected using a parameter sweep. The value of r may be swept from 16 to min(n, m) in increments of 16. For each value, a classification accuracy of the compressed network on a validation data set may be determined. The lowest value of r for which the drop in classification accuracy is acceptable (e.g., below a threshold) may be selected.

In some aspects, a 'greedy search' method may be used to determine the design parameters. For example, one or more of the layers, which exhibit the most promise for compression (e.g., layers with a large number of computations), may be compressed. Thereafter additional layers for compression may be selectively compressed.

In some aspects, good design parameters may be determined by compressing each layer individually. For example, each layer may be compressed to the maximum extent possible so that the functional performance does not drop below a threshold. These design parameters learned for each layer individually may then be used to compress multiple layers in the network together. After compressing multiple layers together, the network may be fine-tuned by updating the weight values in compressed and uncompressed layers to re-capture the drop in functional performance.

In some aspects, the compressed network may be fine-tuned for each determined parameter value (e.g., r) or may be fine-tuned for only the final selected parameter value. The following pseudo-code provides an exemplary heuristic for selecting compression parameters.

```
For each fully-connected layer:
    max_rank = min(n, m)
    for r = 1:max_rank
        compress the selected fully-connected layer (leaving
            others uncompressed)
        determine the classification accuracy
    choose lowest r such that drop in accuracy is below a threshold
compress all fully-connected layers using the corresponding chosen r
    values
fine-tune the compressed network.
```

Insertion of Nonlinear Layers Between Compressed Layers

After replacing a layer with multiple layers, the neurons in the compressed layer may be configured with identity activations. However, nonlinear layers may be added between compressed layers to improve the representational capacity of the network. Moreover, by adding nonlinear layers, higher functional performance may be achieved.

In one exemplary aspect, a rectifier nonlinearity may be inserted. In this example, a threshold may be applied to the output activations of a compressed layer using max(0, x) nonlinearity before passing them to the next layer. In some aspects, the rectifier nonlinearity may be a rectified linear unit (ReLU). Other kinds of nonlinearities including abs(x), sigmoid(x) and hyperbolic tangent (tan h (x)) or the like may also be used.

In some aspects, the neural network may be compressed, a non-linear layer may be inserted and/or fine-tuning may be applied. For example, a neural network with a 9×9 convolution layer may be trained (e.g., using a first set of training examples). The 9×9 convolution layer may then be compressed, replacing it with two 5×5 convolution layers. A nonlinear layer may be added between the two 5×5 convolution layers. Fine-tuning may be performed. In some aspects, the network may then be further compressed by replacing each of the 5×5 convolution layers with two 3×3 convolution layers. Further, a nonlinear layer may be added between each of the 3×3 convolution layers.

Additional fine-tuning and compression may then be repeated until the desired performance is obtained. In the example above, compared to the original network, the final compressed network has four 3×3 convolution layers with nonlinear layers in between instead of one 9×9 convolution layer. The deeper network with three additional convolution and nonlinear layers may achieve better functional performance.

Figure 10:
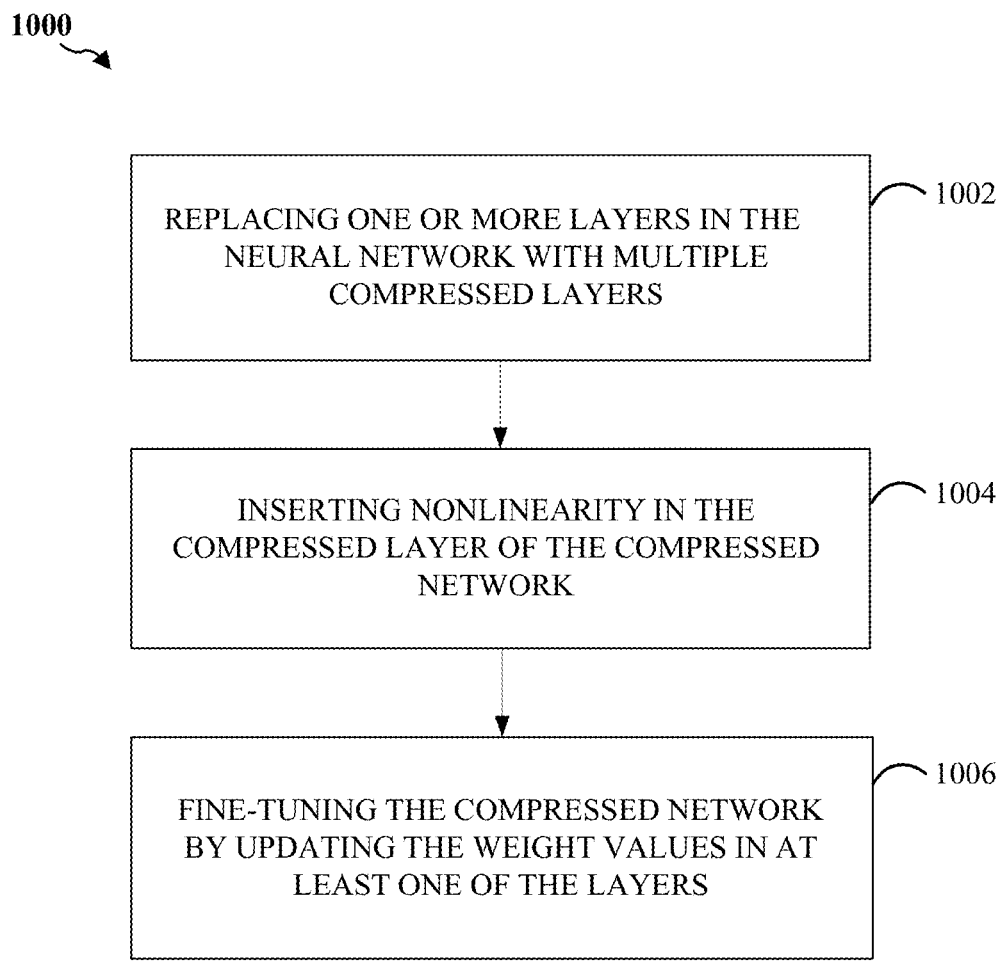
FIGS. 10-13 are flow diagrams illustrating methods for compressing a neural network in accordance with aspects of the present disclosure.

FIG. 10 illustrates a method 1000 for compressing a neural network. In block 1002, the process replaces one or more layers in the neural network with multiple compressed layers to produce a compressed network. In some aspects, the compressed layers are of the same type as the layers in the initial uncompressed network. For example, a fully-connected layer may be replaced by multiple fully-connected layers and a convolutional layer may be replaced by multiple convolutional layers. Likewise, a locally-connected layer may be replaced by multiple locally-connected layers.

In block 1004, the process inserts nonlinearity between the compressed layers of the compressed network. In some aspects, the process inserts the nonlinearity by applying a nonlinear activation function to neurons of the compressed layers. The nonlinear activation function may comprise a rectifier, an absolute value function, hyperbolic tangent function, a sigmoid function or other nonlinear activation function.

Furthermore, in block 1006, the process fine-tunes the compressed network by updating the weight values in at least one of the layers. The fine-tuning may be performed using back propagation or other standard processes. The fine-tuning may be performed by updating all weight values in the compressed neural network or by updating a subset of the compressed layers, a subset of uncompressed layers, or a mix of both. The fine-tuning may be performed using training examples. The training examples may be the same as those used for teaching the original neural network, or may comprise a new set of examples, or a mix of both.

In some aspects, the training examples may comprise data from a smartphone or other mobile device including for example a gallery of photographs.

In some aspects, the process may further include initializing the neural network by repeatedly applying compression, insertion of nonlinear layers, and fine-tuning as a method for initializing deeper neural networks.

Figure 11:
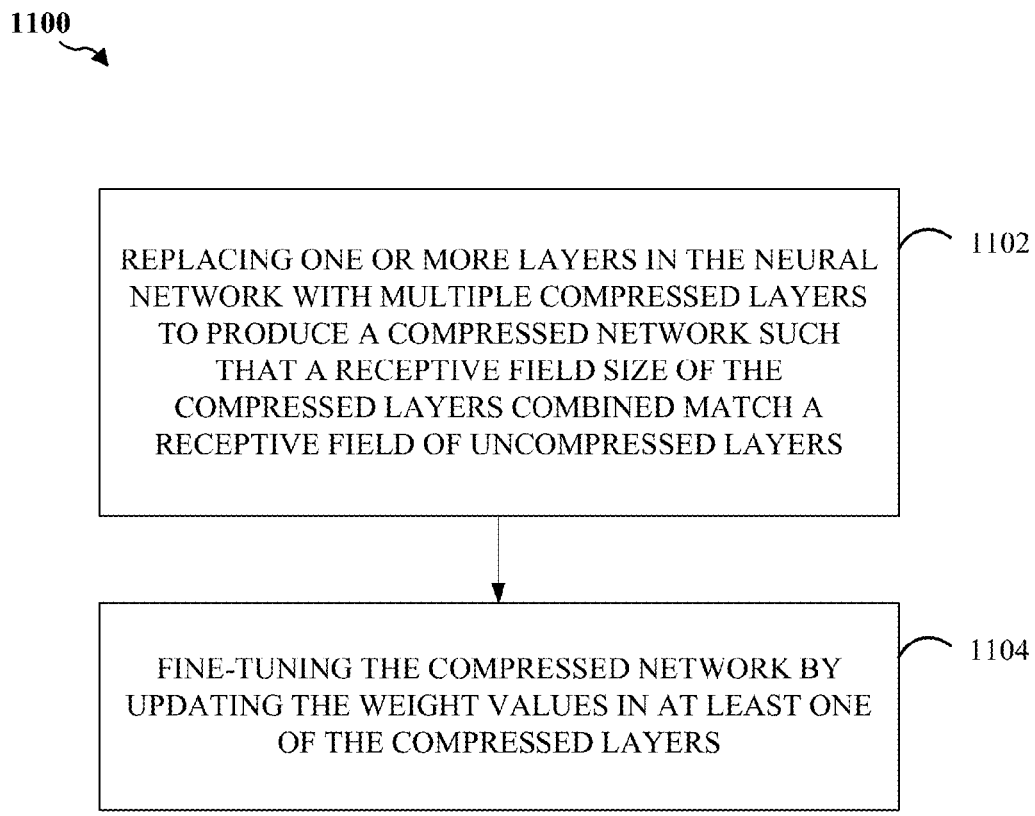

FIG. 11 illustrates a method 1100 for compressing a neural network. In block 1102, the process replaces at least one layer in the neural network with multiple compressed layers to produce a compressed network such that a receptive field size of the compressed layers combined match a receptive field of uncompressed layers. In some aspects, the kernel size of the uncompressed layers is equal to the receptive field size.

Furthermore, in block 1104, the process fine-tunes the compressed network by updating weight values in at least one of the compressed layers.

Figure 12:
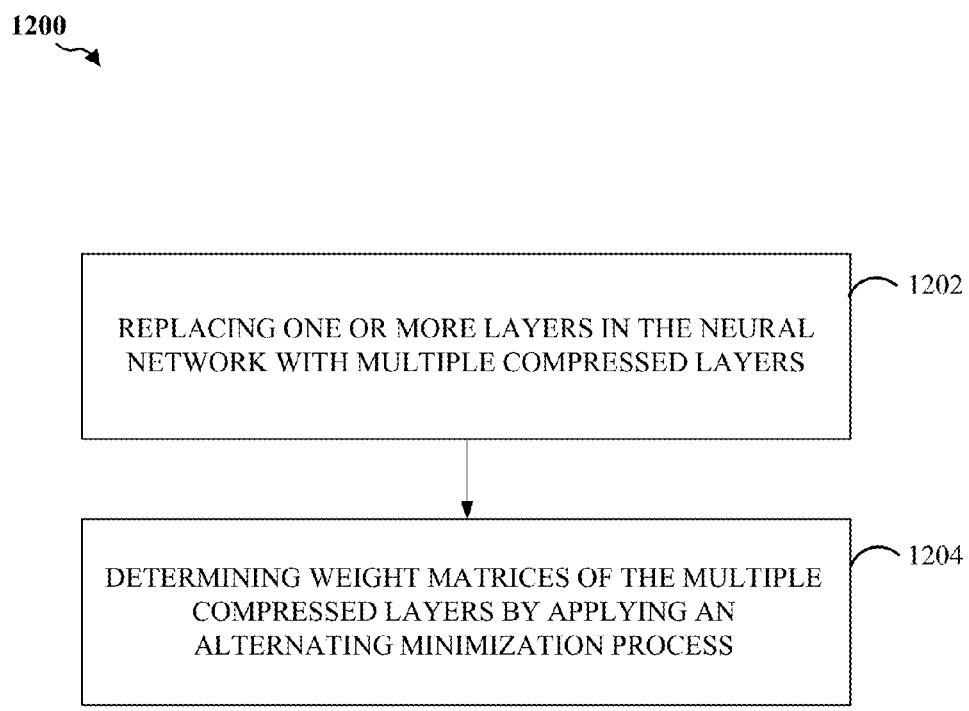

FIG. 12 illustrates a method 1200 for compressing a neural network. In block 1202, the process replaces one or more layers in the neural network with multiple compressed layers to produce a compressed network. In some aspects, the compressed layers are of the same type as the layers in the initial uncompressed network. For example, a fully-connected layer may be replaced by multiple fully-connected layers and a convolutional layer may be replaced by multiple convolutional layers. Likewise, a locally-connected layer may be replaced by multiple locally-connected layers.

Furthermore, in block 1204, the process determines weight matrices of the multiple compressed layers by applying an alternating minimization process.

In some aspects, the process also fine-tunes the compressed network by updating weight values in at least one of the compressed layers. The fine-tuning may be performed by updating all weight values in the compressed neural network or by updating a subset of the compressed layers, a subset of uncompressed layers, or a mix of both. The fine-tuning may be performed using training examples. The training examples may be the same as those used for teaching the original neural network, or may comprise a new set of examples, or a mix of both.

The fine-tuning may be performed in a single stage or may be performed in multiple stages. For example, when fine-tuning is performed in multiple stages, in a first stage, the fine-tuning is performed on only a subset of the compressed layers. Then in the second stage, fine-tuning is performed on a subset of compressed and uncompressed layers.

Figure 13:
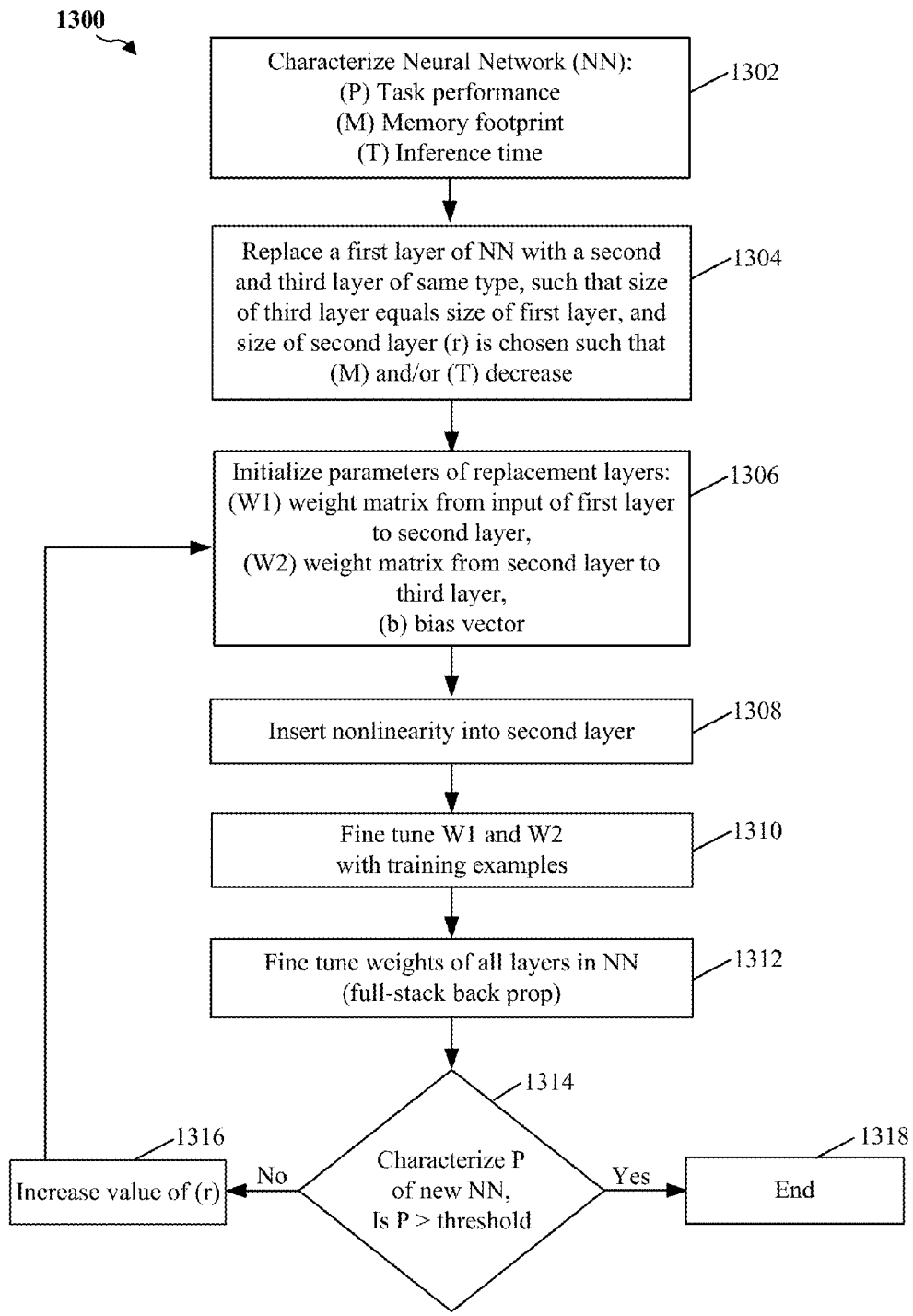

FIG. 13 illustrates a method 1300 for compressing a neural network in accordance with aspects of the present disclosure. In block 1302, the process characterizes a machine learning network, such as a neural network along multiple dimensions. In some aspects, a task performance (P) of the neural network may be characterized. The task performance may be a percentage of correctly classified objects on a testing set if the neural network is an object classifier. A memory footprint (M) and/or an inference time (T) may also be characterized. The memory footprint may, for example correspond to the memory storage requirements of weights and other model parameters of the neural network. The inference time (T) may be the time elapsed during classification of a new object after it is presented to the neural network.

In block 1304, the process replaces one or more layers in the neural network with multiple compressed layers to produce a compressed network. In some aspects, the compressed layers may be of the same type as the layers in the initial uncompressed network. For example, a fully-connected layer may be replaced by multiple fully-connected layers and a convolutional layer may be replaced by multiple convolutional layers. Likewise, a locally-connected layer may be replaced by multiple locally-connected layers. In an exemplary configuration, the process replaces a first layer of the neural network with a second and third layer, such that the size of the third layer equals the size of the first layer. With the third layer thus specified, the output of the third layer of the compressed neural network may mimic the output of the first layer. The process may further specify the size of the second layer, which may be denoted (r), such that the combined memory footprint of the compressed neural network, which includes the second and third layer, is smaller than the memory footprint (M) of the uncompressed neural network. Alternatively, or in addition to a reduction in memory footprint, the size of the second layer may be chosen so that the inference time of the compressed neural network may be smaller than the inference time (T) of the uncompressed neural network.

In block 1306, the process initializes the parameters of the replacement layers of the neural network. In one exemplary configuration, the weight matrix (W1) projecting to the second layer of the compressed neural network, and the weight matrix (W2) projecting from the second layer and to the third layer of the compressed neural network, may be initialized to random values. In some aspects, the initialization of weight parameters may involve an alternating minimization process. In some aspects, the initialization of parameters may involve singular value decomposition. The initial setting of weights may be referred to as an initialization because the weights may undergo further modifications according to additional aspects of the method.

In block 1308, the process inserts nonlinearity between the compressed layers of the compressed network. For example, the process may insert nonlinearity in the second layer of the compressed neural network. In some aspects, the process inserts the nonlinearity by applying a nonlinear activation function to neurons of the compressed layers. The nonlinear activation function may comprise a rectifier, an absolute value function, hyperbolic tangent function, a sigmoid function or other nonlinear activation function.

In block 1310, the process fine-tunes the compressed network by updating the weight values in one or more of the layers. The fine-tuning may be performed using back propagation or other standard processes. The fine-tuning may be performed by updating all weight values in the compressed neural network or by updating a subset of the compressed layers, a subset of uncompressed layers, or a mix of both. The fine-tuning may be performed using training examples. The training examples may be the same as those used for teaching the original neural network, or may comprise a new set of examples, or a mix of both. In an exemplary configuration, the fine-tuning may be performed on the second and third layers of the compressed neural network. In turn, all of the weights in the neural network may be adjusted at block 1312 so that higher levels of task performance may be achieved.

The fine-tuned, compressed neural network may be characterized along several dimensions including, for example, task performance (P). If task performance for the compressed neural network is above an acceptable threshold, the process may terminate. If task performance for the compressed neural network is below the acceptable threshold, the value of (r) (1314:No), which may be the size of a layer in the compressed neural network, may be increased at block 1316. Otherwise (1314:Yes), the process ends at block 1318. The new value of (r) may be chosen such that the memory footprint (M) and/or inference time (T) is smaller than that of the uncompressed neural network. The steps of initializing the parameters, inserting nonlinearity, fine-tuning, and characterizing performance, may be repeated until acceptable task performance is reached.

While the method 1300 depicts a process in which the size of a compressed layer (r) may be increased from a small value to a larger value until an acceptable task performance is obtained, the present disclosure is not so limiting. According to aspects of the present disclosure, the value of (r) may be initially chosen conservatively such that the task performance of the compressed neural network is likely to obtain an acceptable task performance. The method may thus generate a compressed neural network that may be used in place of the uncompressed neural network so that memory footprint or inference time advantages may be realized. The method may then continue to operate such smaller and smaller values of (r) until an acceptable task performance cannot be obtained. In this way, the method may provide increasing levels of compression over the course of the execution of the method.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of compressing a neural network, comprising:

replacing at least one layer in the neural network with a plurality of compressed layers to produce a compressed neural network, a dimension of each compressed layer being less than a dimension of the at least one layer, and a size of a memory footprint of the compressed neural network being less than a memory footprint of the neural network;
inserting nonlinearity between adjacent compressed layers of the compressed neural network by applying a nonlinear activation function to neurons of the plurality of compressed layers, such that the plurality of compressed layers are nonlinear layers; and
fine-tuning the compressed neural network by updating weight values in at least one of the plurality of compressed layers.

2. The method of claim 1, in which the nonlinear activation function is a rectifier, absolute value function, hyperbolic tangent function or a sigmoid function.

3. The method of claim 1, in which the fine-tuning is performed by updating the weight values in the compressed neural network.

4. The method of claim 3, in which the fine-tuning comprises updating weight values in at least one of a subset of the plurality of compressed layers or in a subset of uncompressed layers.

5. The method of claim 3, in which the fine-tuning is performed using training examples, the training examples comprising at least one of a first set of examples used to train an uncompressed neural network or a new set of examples.

6. The method of claim 1, further comprising:
initializing the neural network by repeatedly applying compression, insertion of nonlinear layers, and the fine-tuning as a method for initializing deeper neural networks.

7. A method of compressing a neural network, comprising:
replacing at least one layer in the neural network with multiple compressed layers to produce a compressed neural network such that a receptive field size of the multiple compressed layers combined matches a receptive field size of uncompressed layers, a dimension of each of the multiple compressed layers being less than a dimension of the at least one layer, and a size of a memory footprint of the compressed neural network being less than a memory footprint of the neural network;
inserting nonlinearity between adjacent compressed layers of the compressed neural network by applying a nonlinear activation function to neurons of the plurality of compressed layers, such that the plurality of compressed layers are nonlinear layers; and
fine-tuning the compressed neural network by updating weight values in at least one compressed layer.

8. The method of claim 7, in which a kernel size of the uncompressed layers is equal to the receptive field size.

9. The method of claim 7, in which the replacing comprises replacing at least one layer in the neural network having a kernel size $k_x \times k_y$ with the multiple compressed layers of a same type with the kernel sizes $k_{1x} \times k_{1y}$, $k_{2x} \times k_{2y} \ldots k_{Lx} \times k_{Ly}$, to produce the compressed network in which properties $(k_{1x}-1)+(k_{2x}-1) + \ldots +(k_{Lx}-1)=(k_x-1)$ and $(k_{1y}-1)+(k_{2y}-1)+ \ldots +(k_{Ly}-1)=(k_y-1)$ are satisfied, and in which L is an Lth layer.

10. The method of claim 9, in which a convolutional layer with the kernel size $k_x \times k_y$ is replaced with three convolutional layers with the kernel sizes 1×1, $k_x \times k_y$, and 1×1, respectively.

11. A method of compressing a neural network, comprising:
replacing at least one layer in the neural network with a plurality of compressed layers to produce a compressed neural network, a dimension of each compressed layer being less than a dimension of the at least one layer, and a size of a memory footprint of the compressed neural network being less than a memory footprint of the neural network;
determining weight matrices of the plurality of compressed layers by applying an alternating minimization process; and
inserting nonlinearity between adjacent compressed layers of the compressed neural network by applying a nonlinear activation function to neurons of the plurality of compressed layers, such that the plurality of compressed layers are nonlinear layers.

12. The method of claim 11, further comprising fine-tuning the compressed neural network by updating weight values in at least one of the plurality of compressed layers.

13. The method of claim 12, in which the fine-tuning includes updating weight values in at least one of a subset of the plurality of compressed layers, or a subset of uncompressed layers.

14. The method of claim 12, in which the fine-tuning is performed in multiple stages, in which in a first stage the fine-tuning is performed on a subset of the plurality of compressed layers, and in a second stage the fine-tuning is performed on a subset of the plurality of compressed layers and uncompressed layers.

15. An apparatus for compressing a neural network, comprising:
a memory; and
at least one processor coupled to the memory, the at least one processor configured:
to replace at least one layer in the neural network with a plurality of compressed layers to produce a compressed neural network, a dimension of each compressed layer being less than a dimension of the at least one layer, and a size of a memory footprint of the compressed neural network being less than a memory footprint of the neural network;
to insert nonlinearity between adjacent compressed layers of the compressed neural network by applying a nonlinear activation function to neurons of the plurality of compressed layers, such that the plurality of compressed layers are nonlinear layers; and
to fine-tune the compressed neural network by updating weight values in at least one compressed layer.

16. The apparatus of claim 15, in which the nonlinear activation function is a rectifier, absolute value function, hyperbolic tangent function or a sigmoid function.

17. The apparatus of claim 15, in which the at least one processor is further configured to perform the fine-tune by updating the weight values in the compressed neural network.

18. The apparatus of claim 17, in which the at least one processor is further configured to perform the fine-tuning by updating weight values in at least one of a subset of compressed layers or in a subset of uncompressed layers.

19. The apparatus of claim 17, in which the at least one processor is further configured to perform the fine-tuning by using training examples, the training examples comprising at least one of a first set of examples used to train an uncompressed neural network or a new set of examples.

20. The apparatus of claim 15, in which the at least one processor is further configured to initialize the neural network by repeatedly applying compression, insertion of nonlinear layers, and the fine-tuning as a method for initializing deeper neural networks.

21. An apparatus for compressing a neural network, comprising:
- a memory; and
- at least one processor coupled to the memory, the at least one processor configured:
  - to replace at least one layer in the neural network with multiple compressed layers to produce a compressed neural network such that a receptive field size of the multiple compressed layers combined matches a receptive field size of uncompressed layers, a dimension of each of the multiple compressed layers being less than a dimension of the at least one layer, and a size of a memory footprint of the compressed neural network being less than a memory footprint of the neural network;
  - to insert nonlinearity between adjacent compressed layers of the compressed neural network by applying a nonlinear activation function to neurons of the plurality of compressed layers, such that the plurality of compressed layers are nonlinear layers; and
  - to fine-tune the compressed neural network by updating weight values in at least one of the multiple compressed layers.

22. The apparatus of claim 21, in which a kernel size of the uncompressed layers is equal to the receptive field size.

23. The apparatus of claim 21, in which the at least one processor is further configured to replace at least one layer in the neural network having a kernel size $k_x \times k_y$ with the multiple compressed layers of a same type with the kernel sizes $k_{1x} \times k_{1y}, k_{2x} \times k_{2y}, \ldots k_{Lx} \times k_{Ly}$ to produce the compressed network in which properties $(k_{1x}-1)+(k_{2x}-1) + \ldots +(k_{Lx}-1)=(k_x-1)$ and $(k_{1y}-1)+(k_{2y}-1) + \ldots +(k_{Ly}-1)=(k_y-1)$ are satisfied, and in which L is an Lth layer.

24. The apparatus of claim 23, in which a convolutional layer with the kernel size $k_x \times k_y$ is replaced with three convolutional layers with the kernel sizes 1×1, $k_x \times k_y$ and 1×1 respectively.

25. An apparatus for compressing a neural network, comprising:
- a memory; and
- at least one processor coupled to the memory, the at least one processor configured:
  - to replace at least one layer in the neural network with a plurality of compressed layers to produce a compressed neural network, a dimension of each compressed layer being less than a dimension of the at least one layer, and a size of a memory footprint of the compressed neural network being less than a memory footprint of the neural network;
  - to determine weight matrices of the plurality of compressed layers by applying an alternating minimization process; and
  - to insert nonlinearity between adjacent compressed layers of the compressed neural network by applying a nonlinear activation function to neurons of the plurality of compressed layers, such that the plurality of compressed layers are nonlinear layers.

26. The apparatus of claim 25, in which the at least one processor is further configured to fine-tune the compressed neural network by updating weight values in at least one of the plurality of compressed layers.

27. The apparatus of claim 26, in which the at least one processor is configured to perform the fine-tuning by updating weight values in at least one of a subset of the plurality of compressed layers, or a subset of uncompressed layers.

28. The apparatus of claim 26, in which the at least one processor is further configured to perform the fine-tuning in multiple stages, in which in a first stage the fine-tuning is performed on a subset of the plurality of compressed layers, and in a second stage the fine-tuning is performed on a subset of the plurality of compressed and uncompressed layers.

29. An apparatus for compressing a neural network, comprising:
- means for replacing at least one layer in the neural network with a plurality of compressed layers to produce a compressed neural network, a dimension of each compressed layer being less than a dimension of the at least one layer, and a size of a memory footprint of the compressed neural network being less than a memory footprint of the neural network;
- means for inserting nonlinearity between adjacent compressed layers of the compressed neural network by applying a nonlinear activation function to neurons of the plurality of compressed layers, such that the plurality of compressed layers are nonlinear layers; and
- means for fine-tuning the compressed neural network by updating weight values in at least one of the plurality of compressed layers.

30. An apparatus for compressing a neural network, comprising:
- means for replacing at least one layer in the neural network with multiple compressed layers to produce a compressed neural network such that a receptive field size of the multiple compressed layers combined matches a receptive field size of uncompressed layers, a dimension of each of the multiple compressed layers being less than a dimension of the at least one layer, and a size of a memory footprint of the compressed neural network being less than a memory footprint of the neural network;
- means for inserting nonlinearity between adjacent compressed layers of the compressed neural network by applying a nonlinear activation function to neurons of the plurality of compressed layers, such that the plurality of compressed layers are nonlinear layers; and
- means for fine-tuning the compressed neural network by updating weight values in at least one compressed layer.

31. An apparatus for compressing a neural network, comprising:
- means for replacing at least one layer in the neural network with a plurality of compressed layers to produce a compressed neural network, a dimension of each compressed layer being less than a dimension of the at least one layer, and a size of a memory footprint of the compressed neural network being less than a memory footprint of the neural network;
- means for determining weight matrices of the plurality of compressed layers by applying an alternating minimization process; and
- means for inserting nonlinearity between adjacent compressed layers of the compressed neural network by applying a nonlinear activation function to neurons of the plurality of compressed layers, such that the plurality of compressed layers are nonlinear layers.

32. A non-transitory computer readable medium having encoded thereon program code for compressing a neural network, the program code being executed by a processor and comprising:
- program code to replace at least one layer in the neural network with a plurality of compressed layers to produce a compressed neural network, a dimension of each compressed layer being less than a dimension of the at least one layer, and a size of a memory footprint of the compressed neural network being less than a memory footprint of the neural network;

program code to insert nonlinearity between adjacent compressed layers of the compressed neural network by applying a nonlinear activation function to neurons of the plurality of compressed layers, such that the plurality of compressed layers are nonlinear layers; and program code to fine-tune the compressed network by updating weight values in at least one compressed layer.

33. A non-transitory computer readable medium having encoded thereon program code for compressing a neural network, the program code being executed by a processor and comprising:

program code to replace at least one layer in the neural network with multiple compressed layers to produce a compressed neural network such that a receptive field size of the multiple compressed layers combined matches a receptive field size of uncompressed layers, a dimension of each of the multiple compressed layers being less than a dimension of the at least one layer, and a size of a memory footprint of the compressed neural network being less than a memory footprint of the neural network;

program code to insert nonlinearity between adjacent compressed layers of the compressed neural network by applying a nonlinear activation function to neurons of the plurality of compressed layers, such that the plurality of compressed layers are nonlinear layers; and program code to fine-tune the compressed neural network by updating weight values in at least one of the multiple compressed layers.

34. A non-transitory computer readable medium having encoded thereon program code for compressing a neural network, the program code being executed by a processor and comprising:

program code to replace at least one layer in the neural network with a plurality of compressed layers to produce a compressed neural network, a dimension of each compressed layer being less than a dimension of the at least one layer, and a size of a memory footprint of the compressed neural network being less than a memory footprint of the neural network;

program code to determine weight matrices of the plurality of compressed layers by applying an alternating minimization process; and program code to insert nonlinearity between adjacent compressed layers of the compressed neural network by applying a nonlinear activation function to neurons of the plurality of compressed layers, such that the plurality of compressed layers are nonlinear layers.

* * * * *